United States Patent [19]

Hatta

[11] Patent Number: 4,669,628

[45] Date of Patent: Jun. 2, 1987

[54] SAFETY DEVICE FOR AUTOMATICALLY OPENABLE AND CLOSABLE LID

[75] Inventor: Keizo Hatta, Uozu, Japan

[73] Assignee: Yoshida Kogyo K.K., Tokyo, Japan

[21] Appl. No.: 870,783

[22] Filed: Jun. 5, 1986

[30] Foreign Application Priority Data

Jun. 6, 1985 [JP] Japan .................................. 60-84595

[51] Int. Cl.⁴ ............................................. B65D 55/00
[52] U.S. Cl. ................................... 220/211; 220/245;
49/26; 49/28; 49/54; 49/56
[58] Field of Search ............... 220/212, 211, 244, 245,
220/250, 260, 262, 314, 346, 850; 366/347, 192;
49/26, 27, 28, 54, 56

[56] References Cited

U.S. PATENT DOCUMENTS

| | | | |
|---|---|---|---|
| 1,311,009 | 7/1919 | Rinehimer | 220/244 |
| 3,540,618 | 11/1970 | Lildal | 220/211 |
| 4,334,633 | 6/1982 | Piegza | 220/211 X |
| 4,430,002 | 2/1984 | Dongelmans | 220/211 X |

*Primary Examiner*—Steven M. Pollard
*Attorney, Agent, or Firm*—Hill, Van Santen, Steadman & Simpson

[57] ABSTRACT

An automatically openable lid for a receptacle structure has a safety device for preventing any accident in the presence of an obstacle in the range of opening and closing movements of the lid. The device includes a safety guard extending around a front surface of the lid and beyond a rear surface thereof. The guard is mounted on the lid in a semi-fixed manner such that the guard is normally kept immovable relative to the lid during the movement thereof and such that the guard is pivotally movable relative to the lid when the guard is hit by any obstacle during the movement of the lid. Responsive to the movement of the guard relative to the lid, a detecting means is operable to energize a brake for stopping the movement of the lid.

7 Claims, 12 Drawing Figures

4,669,628

SAFETY DEVICE FOR AUTOMATICALLY OPENABLE AND CLOSABLE LID

BACKGROUND OF THE INVENTION

1. Field of the Invention

The present invention relates to an automatically opening and closing large-sized and heavy pivotable lid for a receptacle structure, such as a container for high-temperature and high-pressure treatment or a vault, and more particularly to a safety device for stopping the pivotal movement of the lid in the presence of any obstacle, such as a person or an object, within the range of movement of the lid, to prevent any accident.

2. Description of the Prior Art

In presure containers for dyeing textile products under high temperature and pressure and for treating inorganic or metallic products with high-temperature vapor or in vaults, because of its largeness and heaviness, the lid is opened and closed automatically, not manually, from a view point of efficiency and safety. Especially in the case where there are installed a number of such containers and the treatment processes therein are remotely and collectively controlled, the opening and closing of the individual lid is also automatically controlled.

In order to prevent any accident during the opening and closing of such automatic lid, there have been proposed a variety of safety means: a warning sign in eye-catching color on the lid or the floor, a guard fence, and a warning signal in sound or light.

However, any of these known safety means must rely on the carefulness of a person and hence is not sufficient. Further, the known safety means cannot cope with the condition if a thing or materials are left within the area of movement of the lid.

SUMMARY OF THE INVENTION

It is therefore an object of the present invention to provide a safety device for an automatically operable lid of a receptacle structure, which enables automatic termination of the opening and closing movements of the lid when any obstacle is present in the path of movement of the lid, irrespective of the carefulness of a person, thus preventing any accident.

Another object of the invention is to provide a safety device which can be easily installed on an existing automatically operating lid.

A further object of the invention is to provide a safety device which is suitable for an automatic treating apparatus; the safety means for automatically stopping movement of a lid can be incorporated in the program of the automatic treatment apparatus.

According to the present invention, an automatically operable lid for a receptacle structure has a safety device for preventing any accident in the presence of an obstacle in the range of opening and closing movements of the lid. The device includes a safety guard extending around a front surface of the lid beyond a rear surface thereof. The guard is mounted on the lid in a semi-fixed manner such that the guard is normally kept immovable relative to the lid during the movement thereof and such that the guard is pivotally movable relative to the lid when the guard is hit by any obstacle during the movement of the lid. Responsive to the movement of the guard relative to the lid, a detecting means is operable to energize a brake for stopping the movement of the lid.

Many other advantages, features and additional objects of the present invention will become manifest to those versed in the art upon making reference to the detailed description and the accompanying drawings in which two preferred embodiments incorporating the principles of the present invention are shown by way of illustrative example.

DETAILED DESCRIPTION

Figure 1:
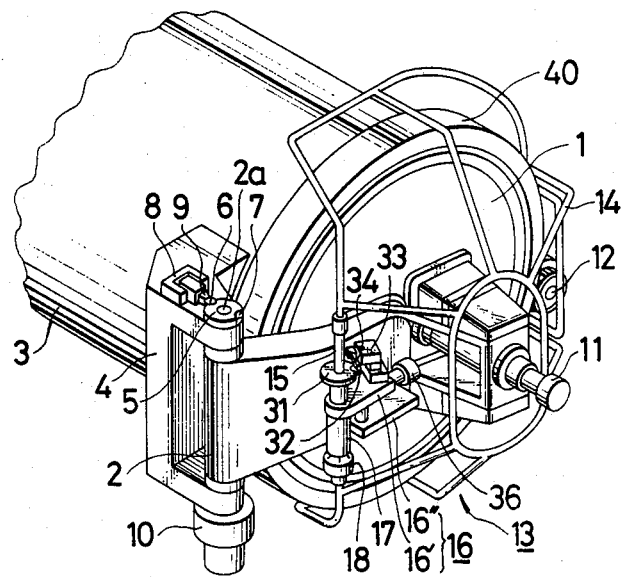
FIG. 1 is a fragmentary perspective view of a pressure container for dye treatment under high temperature and pressure, showing an automatically operable lid on which a safety device embodying the present invention is installed.
Figure 2:
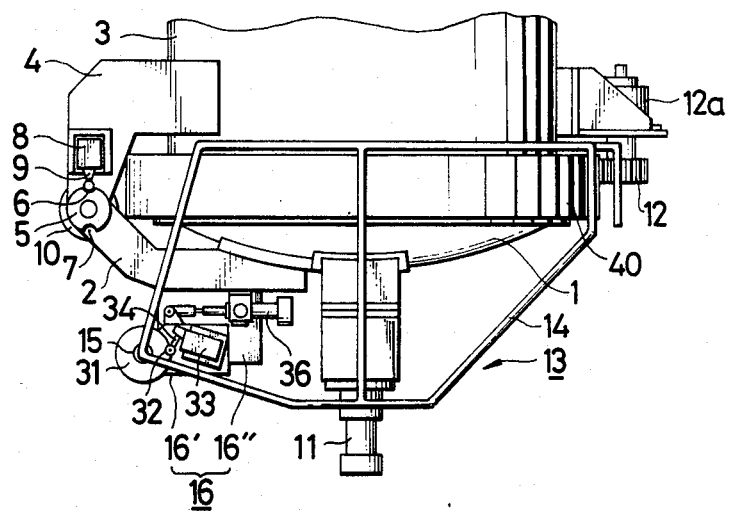
FIG. 2 is a plan view of FIG. 1.
Figure 3:
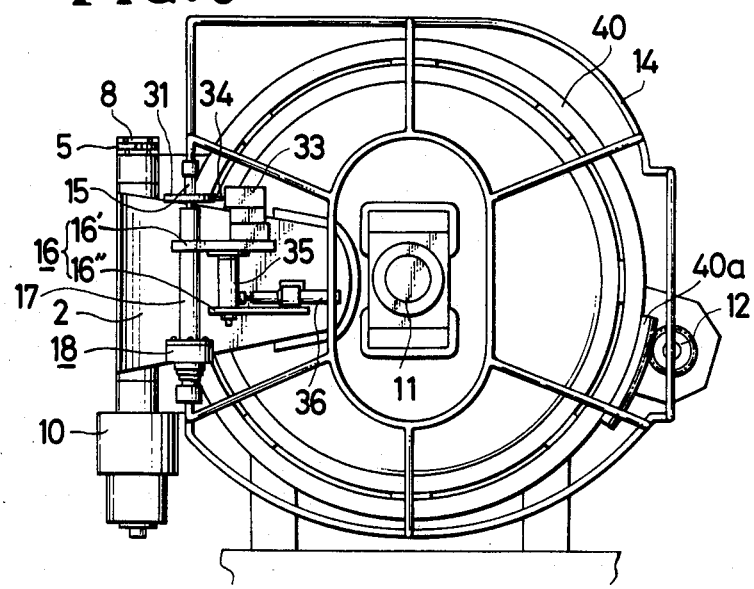
FIG. 3 is a front elevational view of FIG. 1.

FIGS. 1 through 3 illustrate a receptacle structure or a pressure container for treatment of textile products. The container comprises a container body 3, and an automatically opening and closing lid 1 fixedly mounted on a distal end of a support arm 2 extending from a main or first shaft 2a pivotally supported by a C-shaped bracket 4 fixedly mounted on the container body 3. Thus the lid 1 is pivotable about the first shaft 2a to open and close the container. A drive 10, such as a hydraulic motor, is mounted on the lower portion of the first shaft 2a for rotating the first shaft 2a in opposite directions.

A first detection disk 5 is mounted on the upper end of the first shaft 2a and has a pair of recesses 6, 7 in its peripheral surface. A first limit switch 8 is mounted on the top of the bracket 4 and has an actuator 9. The distal end of the actuator 9 is normally disposed against the peripheral surface of the first detection disk 5 and is slidable therealong as the first detection disk 5 is rotated in response to the pivotal movement of the lid 1. When the distal end of the actuator 9 is received in one of the peripheral recesses 6, 7 of the first detection disk 5, the first limit switch 8 is energized to issue a stop signal for de-energizing the drive 10, thus terminating the pivotal movement of the lid 1. Thus the two peripheral recesses 6, 7 of the first detection disk 5 serve to restrict the range of pivotal movement of the lid 1; one peripheral recess 6 corresponds to a fully closed position (FIGS. 1-3 and 5) of the lid 1, and the other peripheral recess 7 corresponds to a fully open position (FIGS. 6 and 7).

A hydraulic cylinder 11 is carried on the lid 1 and projects centrally therethrough for retaining one of opposite ends of a cylindrical beam (not shown) on which elongated textile products to be treated in the container body 3 are wound. For tightly retaining the lid 1 in closed position, a retainer collar 40 is rotated in one direction by means of a gear 12 which is driven by a hydraulic motor 12a and which meshes with a sector gear 40a (FIG. 3) mounted on the collar 40. For opening the lid 1, the retainer collar 40 is rotated in the reverse direction by the gear 12 to release the lid 1.

According to the invention, the container has a safety device 13 for preventing an accident when any obstacle is present in the range or area of pivotal movement of the lid 1. The safety device 13 generally comprises a safety guard or cover 14 carried on the lid 1 and pivotally movable relative thereto only in the presence of an obstacle in the range of pivotal movement of the lid 1, a means for detecting the pivotal movement of the safety guard 14 relative to the lid 1, and a means (not shown) operatively connected with the detecting means for braking pivotal movement of the lid 1.

Figure 7:
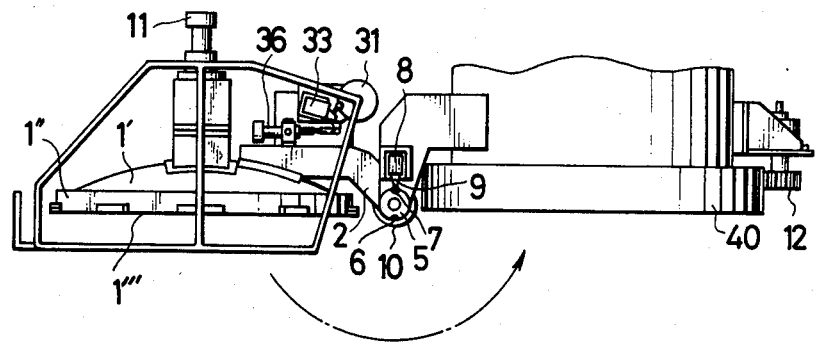

The safety guard 14 includes a sleeve 17 connected to the support arm 2 by means of a support assembly 16, a lattice framework extending around the front surface 1' and the outer peripheral edge 1" of the lid 1 beyond the rear surface 1''' of the lid 1 (as best shown in FIG. 7) and having a shaft portion 15 rotatably received in the sleeve 17, and a torque limiter 18 mounted on the sleeve 17 for normally imparting to the shaft portion 15 a predetermined amount of resistance against rotation.

Figure 4:
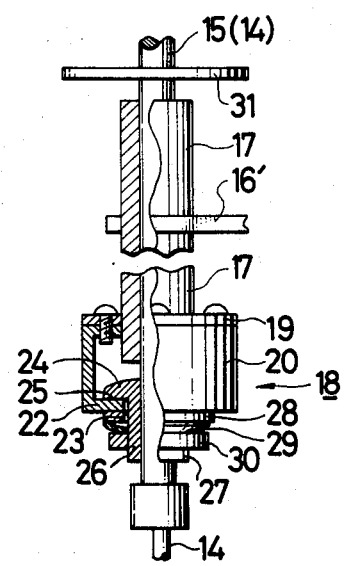
FIG. 4 is a fragmentary enlarged cross-sectional view of FIG. 3, showing a torque limiter of the safety device.

As shown in FIG. 4, the torgue limiter 18 includes: a case 20 of generally U-shaped axial cross section secured to a flange 19 of the sleeve 17 and having a central opening 23 in a base 22 of the case; a bearing member fixedly mounted on the shaft portion 15 of the lattice framework and having a head 24 loosely received in said case 20 and a sleeve-like portion 26 projecting centrally from the lower side of the head 24 and loosely received in the central opening 23; and an urging means acting between the case 20 and the sleeve-like portion 26 of the bearing member to normally urge the head 24 of the bearing member against the base 22 of the case 20. The urging means is a Belleville or coned disk spring 29 held against the base 22 of the case 20 via a ring washer 28 by a ring nut 30 threadedly mounted on the lower end 27 of the sleeve-like portion 26. By turning the ring nut 30, it is possible to adjust the amount of resilient force of the spring 29.

Consequently, the shaft portion 15 of the lattice framework is secured to the sleeve 17 in a semi-fixed manner such that the lattice framework (safety guard 14) is normally kept immovable relative to the lid 1, with a predetermined space therefrom in the absence of any obstacle during the pivotal movement of the lid 1, and such that the lattice framework is pivotally movable relative to the lid 1 about the sleeve 17 against the friction provide by the resilience of the spring 29 when the lattice framework is hit by any obstacle during the pivotal movement of the lid 1 in either direction.

As shown in FIGS. 1 through 3, the support assembly 16 includes a first support plate 16' fixedly connected at one end to the sleeve 17, and a second support plate 16" fixedly connected at one end to the support arm 2 of the lid 1 and at the other end to the other end of the first support plate 16' via an auxiliary shaft 35 fixedly secured thereto.

Figure 8:
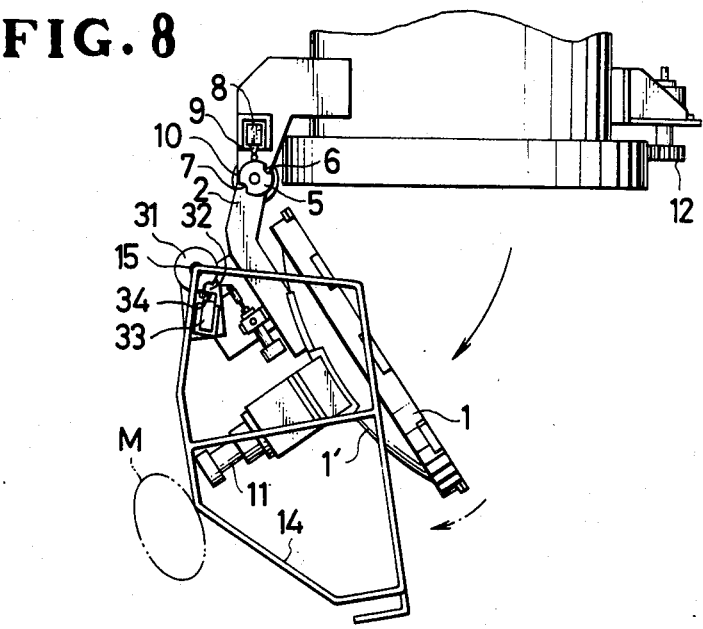
Figure 9:
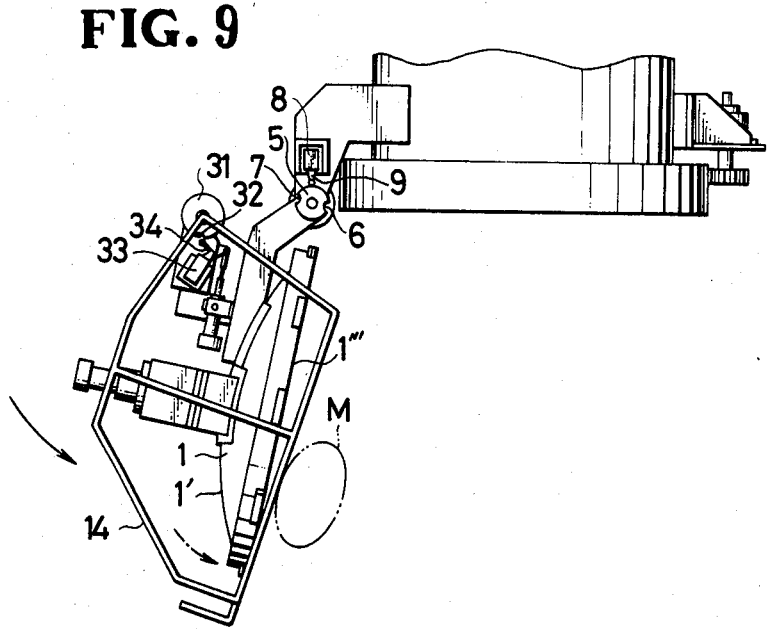

The detecting means includes a second limit switch 33 mounted on the first support plate 16', and a second detection disk 31 fixedly mounted on the shaft portion 15 of the lattice framework (of the safety guard 14); the second limit switch 33 has an actuator 34 and is operable to energize the non-illustrated brake. The second detection disk 31 has a peripheral recess 32 normally receiving a distal end of the actuator 34 of the second limit switch 33 while the shaft portion 15 and hence the second detection disk 31 is kept non-rotatable relative to the sleeve 17 during the pivotal movement of the lid 1, as shown in FIGS. 1–3, 5–7, and 10. The second detection disk 31 is rotatable relative to the sleeve 17, when the shaft portion 15 is rotated relative to the sleeve 17 against the rotational resistance of the torgue limiter 18, so as to bring the distal end of the actuator 34 out of the peripheral recess 32 to cause the second limit switch 33 to be operative, as shown in FIGS. 8, 9 and 11.

A hydraulic cylinder 36 is mounted on the second support plate 16" and serves as an auxiliary drive for rotating the auxiliary shaft 35 to angularly move the first support plate 16' through a predetermined angle about the auxiliary shaft 35, while keeping the second detection disk 31 non-rotatable relative to the sleeve 17 and hence the actuator 34 of the second limit switch 33, to thereby adjust or select the space between the lattice framework and the lid 1 prior to the pivotal movement of the lid 1.

The operation of the lid 1 with the safety device 13, in the absence of any obstacle, is described hereinbelow in connection with FIGS. 5 through 7.

Figure 5:
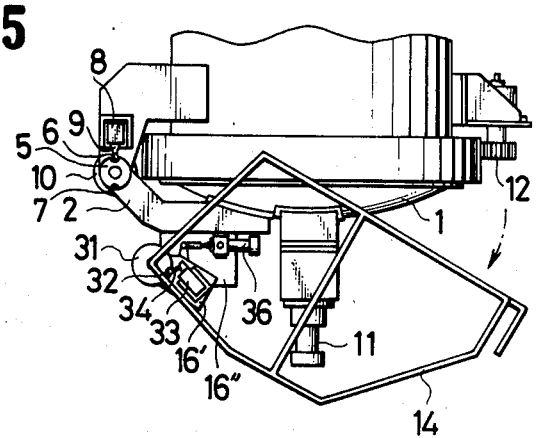
FIGS. 5 through 9 are fragmentary plan views of the pressure container, showing the position of the lid and the safety device at various stages of opening and closing operation of the lid.
Figure 6:
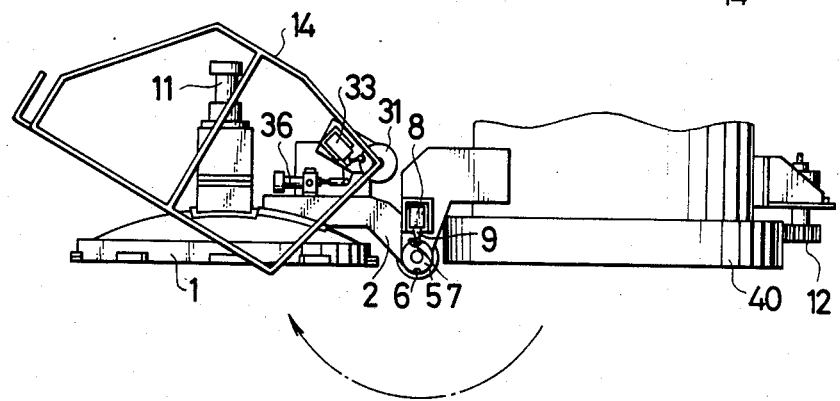

For opening the lid 1 from the closed position of FIGS. 1–3 the lid 1 is released by rotating the retainer collar 40 by driving the gear 12, and then the first support plate 16' is angularly moved by the hydraulic cylinder 36 to pivotally move the lattice framework (of the safety guard 14) clockwise through a predetermined angle about the auxiliary shaft 35 from the position of FIG. 1 to the position of FIG. 5, namely, until the outermost or frontmost portion of the lattice framework is disposed outwardly of the outer end of the hydraulic cylinder 11.

Figure 10:
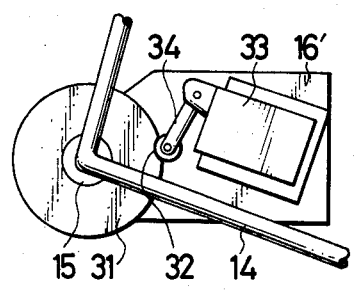
FIGS. 10 and 11 are fragmentary plan views of the safety device, showing the manner in which the presence of an obstacle is detected by a safety guard, a detection disk and a limit switch.
Figure 11:
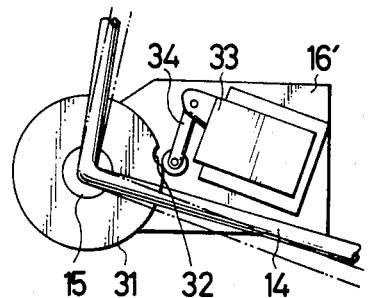

Subsequently, the hydraulic motor 10 is started to pivotally move the lid 1 clockwise in FIG. 5, during which time the lattice framework is kept immovable relative to the lid 1 with the distal end of the actuator 34 of the second limit switch 33 received in the peripheral recess 32 of the second detection disk 31, as shown in FIG. 10. When the lid 1 is opened to a predetermined extent as shown in FIG. 6, the distal end of the actuator 9 of the first limit switch 8 falls in one pheripheral recess 7 of the first detection disk 5, whereupon the first limit switch 8 issues a stop signal to de-energize the drive 10, thus terminating the pivotal movement of the lid 1.

For closing the lid 1 from the open position of FIG. 6, the first support plate 16' is angularly moved by the hydraulic cylinder 36 to pivotally move the lattice framework counterclockwise through a predetermined angle about the auxiliary shaft 35 from the position of FIG. 6 to the position of FIG. 7, namely, until the innermost or rearmost portion of the lattice framework is disposed outwardly of the rear surface 1''' of the lid 1. Then the hydraulic motor 10 is reversely driven to pivotally move the lid 1 countercloskwise in FIG. 7, during which time the lattice framework is kept immovable relative to the lid 1 with the distal end of the actuator 34 of the second limit switch 33 received in the peripheral recess 32 of the second detection disk 31, as shown in FIG. 10. When the lid 1 is fully closed as shown in FIGS. 1–3 the distal end of the actuator 9 of the first limit switch 8 falls into the other peripheral recess 6 of the first detection disk 5, whereupon the first limit switch 8 issues a stop signal to de-energize the drive 10, thus terminating the pivotal movement of the lid 1. Finally, the lid 1 is tightly secured to the retainer body 3 by rotating the retainer collar 40 by driving the gear 12 reversely.

In the presence of an obstacle, e.g. the operator, materials to be treated or equipment, in the range of pivotal movement of the lid 1, the pivotal movement of the lid 1 will be terminated in the following manner.

During the opening of the lid 1 from the position of FIG. 5 toward the position of FIG. 6, the lattice framework is hit by the obstacle M (FIG. 8) to discontinue its further clockwise movement; that is, the lattice framework is pivotally moved about its shaft portion 15 relative to the lid 1 against the rotational resistance provided by the torgue limiter 18. The second detection disk 31 is thereby angularly moved so as to bring the distal end of the actuator 34 of the second limit switch 33 out of the peripheral recess 32 as shown in FIGS. 8 and 11, whereupon the second limit switch 33 issues a stop signal to energize the non-illustrated brake which in turn de-energizes the drive 10.

Likewise, during the closing of the lid 1 from the position of FIG. 7 toward the position of FIGS. 1-3 the lattice framework is hit by the obstacle M (FIG. 9) to discontinue its further counterclockwise movement; that is the lattice framework is pivotally moved about its shaft portion 15 relative to the lid 1 against the rotational resistance by of the torque limiter 18. The second detector disk 31 is thereby angularly moved so as to bring the distal end of the actuator 34 of the second limit switch 33 out of the peripheral recess 32 as shown in FIG. 9, whereupon the second limit switch 33 issues a stop signal to energize the non-illustrated brake which in turn de-energizes the drive 10.

As discussed hereinabove, according to the safety device 13 of the present invention, safety can be secured during the opening and closing operation of the automatic lid 1.

The safety device 13 is particularly useful when embodied in an automatic treating container because the automatic stopping operation of a lid by the safety device can be incorporated in the program of automatically controlling the treatment operation. With this safety device 13, it is possible not only to secure safety but to increase the efficiency of treatment.

In the foregoing embodiment, the sleeve 17 is angularly movably connected to the support arm 2 of the lid 1 by means of the two support plates 16', 16" in order to angularly move the lattice framework, until the frontmost portion of the lattice framework is disposed outwardly of the outer end of the hydraulic cylinder 11, prior to the opening of the lid 1. For this purpose, the auxiliary drive 36 is supported on the second support plate 16".

Figure 12:
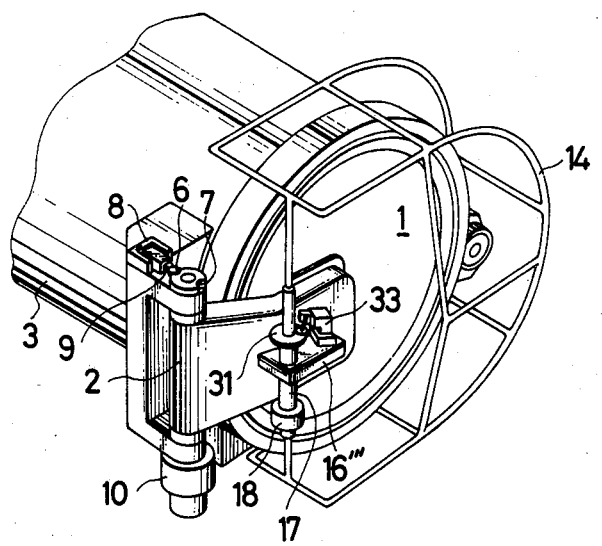
FIG. 12 is a perspective view similar to FIG. 1, showing a modified safety device.

FIG. 12 shows a modified treating container in which there is no projection (hydraulic cylinder 11) on the front of the lid 1. In this modified container, it is not necessary to angularly move the lattice framework prior to the opening of the lid 1. Consequently, the first support plate 16' may be a support plate 16 fixedly secured directly to the support 2, while the second support plate 16" and the auxiliary drive 36 may be omitted. Thus, in the embodiment of FIG. 12, the lattice framework is pivotally movable relative to the lid 1 only about the sleeve 17.

Alternatively, in the foregoing embodiments, the detecting means, i.e. the limit switches 8, 33 and the detection disks 5, 31, may comprise photoelectric type switches or reed switches. Further, the torgue limiter 18 may comprise hydraulic or pneumatic means.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A safety device for an automatically opening and closing lid pivotally mounted on a receptacle structure said device, comprising:
   (a) a safety guard for extending around a front surface and an outer peripheral edge of the lid beyond a rear surface of the lid, said safety guard being adapted to be mounted on the lid in a semi-fixed manner such that said safety guard is normally kept immovable relative to the lid with a predetermined space therefrom during the pivotal movement of the lid and such that said safety guard is pivotally movable relative to the lid to change said space when said safety guard engages any obstacle if the latter be present in the path of the pivotal movement of the lid;
   (b) means for detecting the pivotal movement of said safety guard relative to the lid and hence the change of said space; and
   (c) means operatively connected with said detecting means for braking the pivotal movement of the lid.

2. A safety device according to claim 1, said safety guard including a sleeve adapted to be immovably supported by the lid, a lattice framework having a shaft portion rotatably received in said sleeve, and a torque limiter mounted on said sleeve for normally imparting to said shaft portion a predetermined amount of resistance against rotation.

3. A safety device according to claim 2, said torgue limiter including:
   a case secured to one end of said sleeve and having a central opening in a base of said case;
   a bearing member fixedly mounted on said shaft portion, and having a head loosely received in said case and a sleeve-like portion projecting centrally from one side of said head and loosely received in said central opening; and
   urging means acting between said case and said sleeve-like portion of said bearing member to normally urge said head of said bearing member frictionally against said base of said case.

4. A safely device according to claim 3, said urging means including a spring.

5. A safety device according to claim 4, said spring being a coned disk spring.

6. A safety device according to claim 2, said detecting means including:
   a limit switch fixedly supported by said sleeve and operable to energize the braking means, said limit switch having an actuator; and
   a detection disk fixedly mounted on said shaft portion of said lattice framework and havng a peripheral recess for normally receiving a distal end of said actuator while said shaft portion and hence said detection disk is kept non-rotatable relative to said sleeve during the pivotal movement of the lid, said detection disk being rotatable, when said shaft portion is rotated relative to said sleeve against said predetermined amount of resistance of said torgue limiter, so as to bring the distal end of said actuator out of said periheral recess to cause said limit switch operative.

7. A safety device according to claim 6, further comprising:

a first support plate fixedly connected at one end to said sleeve and supporting thereon said limit switch;

a second support plate adapted to be fixedly connected at one end to the lid and pivotally connected at the other end to the other end of said first support plate via an auxiliary shaft fixedly secured thereto; and an auxiliary drive supported on said second support plate for angularly moving said auxiliary shaft and hence said first support plate through a predetermined angle about said auxiliary shaft, without rotating said detection disk relative to said sleeve and hence said actuator of said limit switch, to thereby adjust said space prior to the pivotal movement of the lid.

* * * * *